United States Patent
Baker et al.

(10) Patent No.: US 7,474,709 B2
(45) Date of Patent: Jan. 6, 2009

(54) FREQUENCY SHIFT KEYING MODULATOR AND APPLICATIONS THEREOF

(75) Inventors: Tom Baker, Los Angeles, CA (US); Henrik T. Jensen, Long Beach, CA (US)

(73) Assignee: Broadcom Corporation, Irvine, CA (US)

( * ) Notice: Subject to any disclaimer, the term of this patent is extended or adjusted under 35 U.S.C. 154(b) by 926 days.

(21) Appl. No.: 10/837,064

(22) Filed: Apr. 30, 2004
(Under 37 CFR 1.47)

(65) Prior Publication Data
US 2005/0243948 A1    Nov. 3, 2005

Related U.S. Application Data

(63) Continuation-in-part of application No. 09/993,541, filed on Nov. 14, 2001, now Pat. No. 6,907,089.

(51) Int. Cl.
*H03C 3/00* (2006.01)
*H04B 1/40* (2006.01)

(52) U.S. Cl. ..................... 375/303; 455/86

(58) Field of Classification Search ........... 375/303, 375/295, 304; 455/76, 86
See application file for complete search history.

(56) References Cited

U.S. PATENT DOCUMENTS

| | | | |
|---|---|---|---|
| 6,674,812 B1* | 1/2004 | Stevenson | 375/302 |
| 6,678,503 B1* | 1/2004 | Black et al. | 455/76 |
| 6,747,987 B1* | 6/2004 | Meador et al. | 370/465 |

* cited by examiner

*Primary Examiner*—Khai Tran
(74) *Attorney, Agent, or Firm*—Garlick Harrison & Markison; Timothy W. Markison

(57) ABSTRACT

An FSK modulator and applications thereof are disclosed. The FSK modulator comprises a phase-locked loop, a frequency divider module, an image rejection mixer and a summing module. The phase-locked loop is operably coupled to generate a first oscillation from a reference oscillation. The frequency divider module is operably coupled to divide the first oscillation to produce a second oscillation. The image-rejection mixer is operably coupled to mix the second oscillation with a low intermediate oscillation to produce a mixed data signal, and the summing module is operably coupled to sum the mixed data signal with the first oscillation to produce an FSK modulated signal.

27 Claims, 8 Drawing Sheets prior art modulation scheme local oscillation module 74

FSK modulator 150

FSK modulator 150 apparatus 190

FREQUENCY SHIFT KEYING MODULATOR AND APPLICATIONS THEREOF

This patent application under 35 U.S.C. §120 as a continuation in part patent application of claiming priority to co-pending patent application entitled DIGITAL DEMODULATION AND APPLICATIONS THEREOF, having a filing date of Nov. 14, 2001 and a serial number of 09/993,541 now U.S. Pat. No. 6,907,089.

TECHNICAL FIELD OF THE INVENTION

This invention relates generally to wireless communication systems and, more particularly, to radio frequency integrated circuits used in such wireless communication systems.

BACKGROUND OF THE INVENTION

Communication systems are known to support wireless and wire-lined communications between wireless and/or wire-lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, et cetera, communicates directly or indirectly with other wireless communication devices. For direct communications (also known as point-to-point communications), the participating wireless communication devices tune their receivers and transmitters to the same channel or multiple channels (e.g., one or more of the plurality of radio frequency (RF) carriers of the wireless communication system) and communicate over that channel or channels. For indirect wireless communications, each wireless communication device communicates directly with an associated base station (e.g., for cellular services) and/or an associated access point (e.g., for an in-home or in-building wireless network) via an assigned channel, or channels. To complete a communication connection between the wireless communication devices, the associated base stations and/or associated access points communicate with each other directly, via a system controller, via the public switch telephone network, via the internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver receives RF signals, demodulates the RF carrier frequency from the RF signals to produce baseband signals, and demodulates the baseband signals in accordance with a particular wireless communication standard to recapture the transmitted data. The receiver is coupled to an antenna and includes a low noise amplifier, one or more intermediate frequency stages, a filtering stage, and a data recovery stage. The low noise amplifier receives inbound RF signals via the antenna and amplifies them. The one or more intermediate frequency stages mix the amplified RF signals with one or more local oscillations to convert the amplified RF signals into the baseband signals or intermediate frequency (IF) signals. The filtering stage filters the baseband signals or the IF signals to attenuate unwanted out-of-band signals to produce filtered signals. The data recovery stage recovers raw data from the filtered signals in accordance with the particular wireless communication standard.

As is also known, the transmitter converts data into RF signals by modulating the data to produce baseband signals and mixing the baseband signals with an RF carrier to produce RF signals. The transmitter includes a data modulation stage, one or more intermediate frequency stages, and a power amplifier. The data modulation stage converts the raw data into baseband signals in accordance with a particular wireless communication standard. The one or more intermediate frequency stages mix the baseband signals with one or more local oscillations to produce the RF signals. The power amplifier amplifies the RF signals prior to transmission via the antenna.

The local oscillations used in both the transmitter and in the receiver may be produced by the same or different local oscillation generators. Such a local oscillator may be in the form a phase locked loop (PLL), where the output frequency of the PLL is used as the local oscillation. Local oscillators used in direct conversion or very low intermediate frequency (VLIF) transmitters and receivers include a PLL that produces an output frequency of approximately $\frac{2}{3}^{rd}$ of the desired local oscillation. To obtain the desired local oscillation, the output frequency of the PLL is divided by 2, creating a frequency of approximately $\frac{1}{3}^{rd}$ the desired local oscillation and then added to the original $\frac{2}{3}^{rd}$ of the desired local oscillation. For example, as shown in FIG. 1, the PLL may produce an output oscillation of 1600 MHz, which divided by two equals 800 MHz, and, when mixed together, the resulting local oscillation of 2400 MHz is obtained.

As is also shown in FIG. 1, the local oscillation can be fed into a frequency shift keying (FSK) modulator (an I-Q mixer) in which an FSK baseband signal is directly mixed with the local oscillation signal to form an FSK modulated signal. The FSK modulated signal is an RF signal that can then be fed to, for example, a transmitter power amplifier.

A shortcoming with any I-Q mixer is keeping proper 90 degree phase-shifts on all ports of the mixer to prevent feedthrough of the image frequency, which is the opposite signed portion of the baseband data signal riding on the local oscillation from that portion of the baseband data signal being transmitted. In an on-channel FSK modulator such as described above, the image frequency falls in-band (e.g., local oscillation frequency +/−baseband signal frequency), so excellent balance must be maintained across frequency, temperature, and integrated circuit process variation in order to attain an acceptable output signal from the FSK modulator. As frequencies get higher, the I-Q balance is difficult to achieve, resulting in in-band image frequency leakage that adversely affects the signal-to-noise ratio (SNR) of the modulated FSK signal.

Further, prior to transmission of the modulated FSK signal, it is passed through a power amplifier (PA) that amplifies the signal by, for example, 20-30 dB. Applying such gain to a high frequency signal can result in feedback of the amplified modulated signal to the FSK modulator, which corrupts the original modulated signal. Such corruption results because the feedback signal is phase-shifted from the original modulated signal, which disrupts the I-Q balance of the modulated signal, resulting in increased image frequency feed-through or other adverse effects, such as variance in the signal amplitude. In an on-chip radio system there are typically several feedback paths that are layout dependent. These feedback paths can cause varying amounts of phase and amplitude feedback into the FSK modulator. As a result, radio systems incorporating a prior art local oscillation generation and high frequency modulation scheme will suffer from in-band image frequency leakage and feedback of the amplified FSK modulated signal into the FSK modulator, resulting in a high signal-to-noise ratio and degraded RF signals.

Therefore, a need exists for an FSK modulator and local oscillation generator that reduce and/or eliminate in-band image frequency leakage and feedback problems associated with the prior art.

BRIEF SUMMARY OF THE INVENTION

The FSK modulator and variations thereof of the present invention substantially meet these needs and others. The FSK modulator comprises a phase-locked loop, a frequency divider module, an image rejection mixer and a summing module. The phase-locked loop is operably coupled to generate a first oscillation from a reference oscillation. The frequency divider module is operably coupled to divide the first oscillation to produce a second oscillation. The image-rejection mixer is operably coupled to mix the second oscillation with a low intermediate oscillation to produce a mixed data signal, and the summing module is operably coupled to sum the mixed data signal with the first oscillation to produce an FSK modulated signal.

The phase-locked loop comprises a phase and frequency detection module, a charge pump, a loop filter, a voltage controlled oscillator (VCO), and a divider module. The phase and frequency detection module is operably coupled to detect a phase and/or frequency difference between a reference oscillation and a feedback oscillation to produce a difference signal (e.g., charge up signal, charge down signal, zero signal). The output of the phase and frequency detection module is provided to a charge pump, which creates a current signal therefrom. The loop filter filters the current signal to produce a control voltage. The VCO receives the control voltage and produces an output oscillation therefrom, which may be the first oscillation and which is the input oscillation of the frequency divider module and of the summing module. The frequency divider module receives the first oscillation and divides the first oscillation to produce a second oscillation, which is provided as an input to the image-rejection mixer.

The image-rejection mixer mixes the second oscillation with a low intermediate oscillation received from, for example, a filtering/gain module in the radio transmission path, to produce the mixed data signal. The image-rejection mixer comprises first and second mixers, first and second phase-shift modules, and a mixer summing module. The first mixer is operably coupled to mix the second oscillation with the low intermediate oscillation to produce a first mixed oscillation. The first phase-shift module is operably coupled to phase-shift the second oscillation to produce a phase-shifted second oscillation. Similarly, the second phase-shift module is operably coupled to phase-shift the low intermediate oscillation to produce a phase-shifted low intermediate oscillation and the second mixer is operably coupled to mix the phase-shifted second oscillation with the phase-shifted low intermediate oscillation to produce a second mixed oscillation. The mixer summing module is operably coupled to sum the first mixed oscillation with the second mixed oscillation to produce the mixed data signal. The image rejection mixer performs the phase shifts and mixing operations to ensure that only the desired portion of the low intermediate oscillation is passed through to the power amplifier for transmission (i.e., it rejects the unwanted image frequency).

Because the frequency divider module of the embodiments of the FSK modulator of this invention divides the first oscillation to a frequency less than (e.g., one half) the frequency of the first oscillation prior to FSK modulation in the image-rejection mixer, in-band image feed-through is reduced, resulting in an FSK modulator output signal having an improved signal-to-noise ratio. Further, any feedback of the mixed data signal back into the FSK modulator will happen at a frequency outside the frequency band of the oscillations within the image-rejection mixer, and therefore will have little effect on the modulation properties of the mixed data signal.

The various embodiments of the FSK modulator of this invention may be used in a local oscillation module and/or in an IF mixing stage of a radio transmitter. By utilizing the FSK modulator in a radio transmitter, the overall performance of the radio transmitter is enhanced because I-Q balance is easier to achieve in a lower frequency modulation circuit.

DETAILED DESCRIPTION OF THE INVENTION

Figure 1:
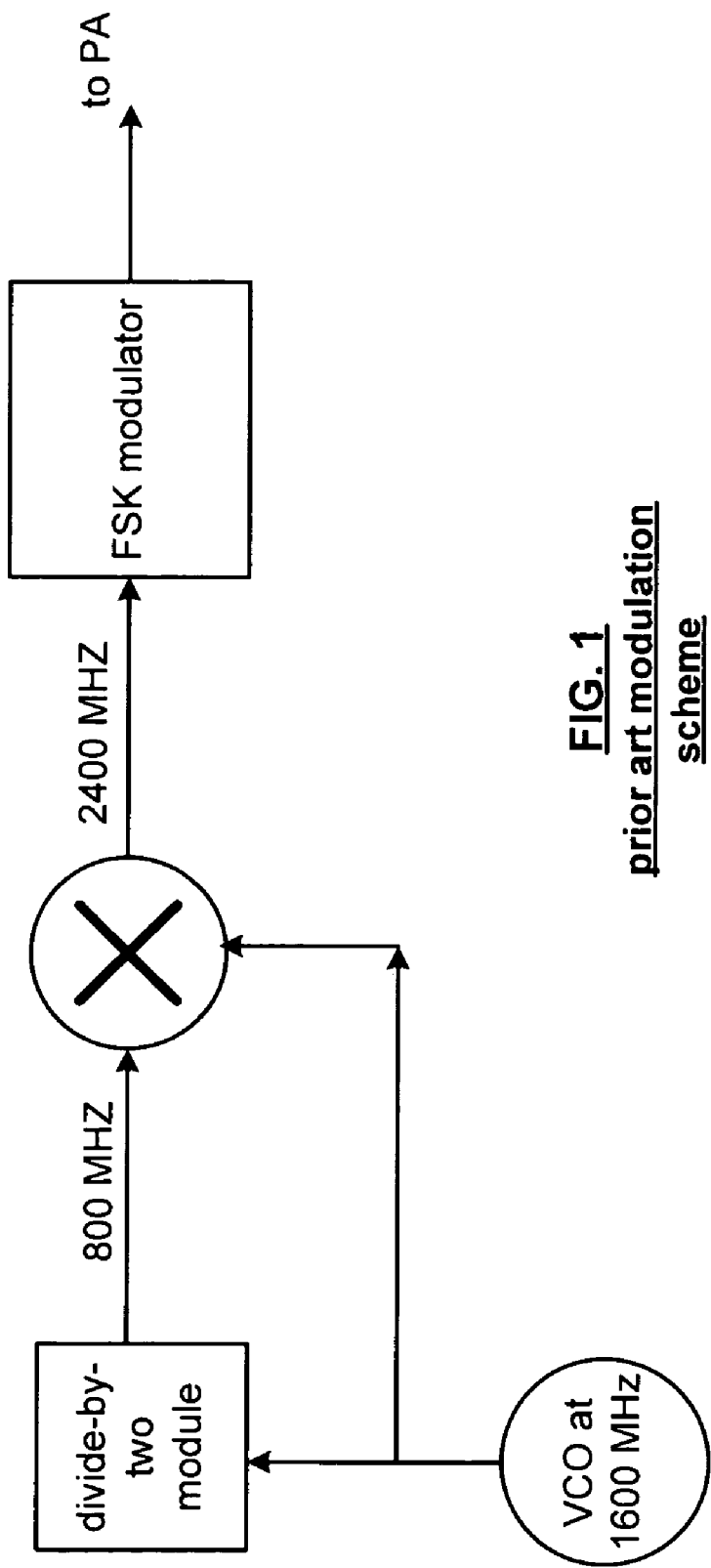
FIG. 1 illustrates a prior art local oscillation generator/FSK modulator.
Figure 2:
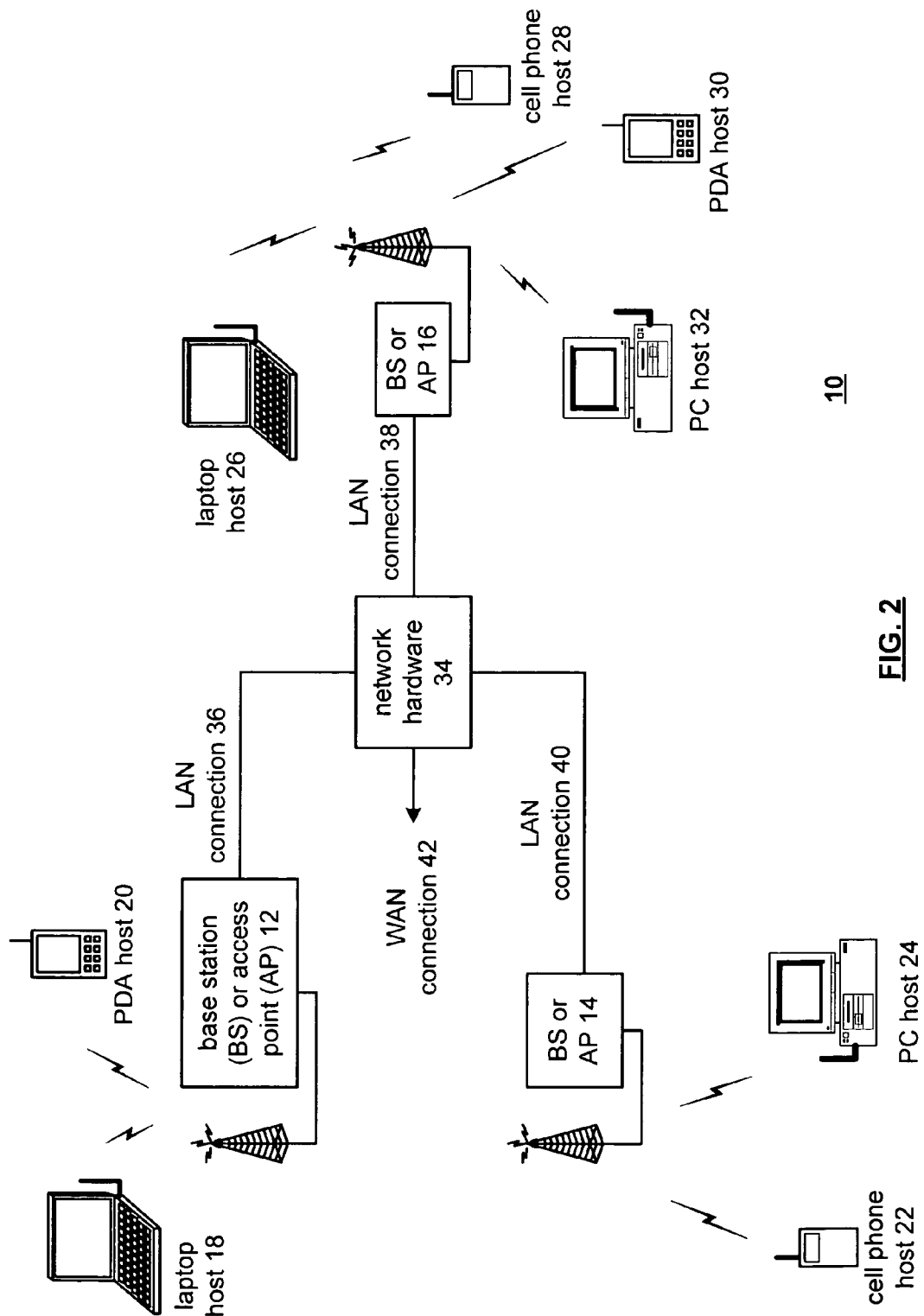
FIG. 2 is a schematic block diagram of a wireless communication system in accordance with the present invention.

FIG. 2 is a schematic block diagram illustrating a communication system 10 that includes a plurality of base stations and/or access points 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. The details of the wireless communication devices will be described in greater detail with reference to FIG. 3.

The base stations or access points 12-16 are operably coupled to the network hardware 34 via local area network connections 36, 38 and 40. The network hardware 34, which may be a router, switch, bridge, modem, system controller, et cetera provides a wide area network connection 42 for the communication system 10. Each of the base stations or access points 12-16 has an associated antenna or antenna array to communicate with the wireless communication devices in its area. Typically, the wireless communication devices register with a particular base station or access point 12-14 to receive services from the communication system 10. For direct connections (i.e., point-to-point communications), wireless communication devices communicate directly via an allocated channel. Typically, base stations are used for cellular telephone systems and like-type systems, while access points are used for in-home or in-building wireless networks. Regardless of the particular type of communication system, each wireless communication device includes a built-in radio and/or is coupled to a radio.

Figure 3:
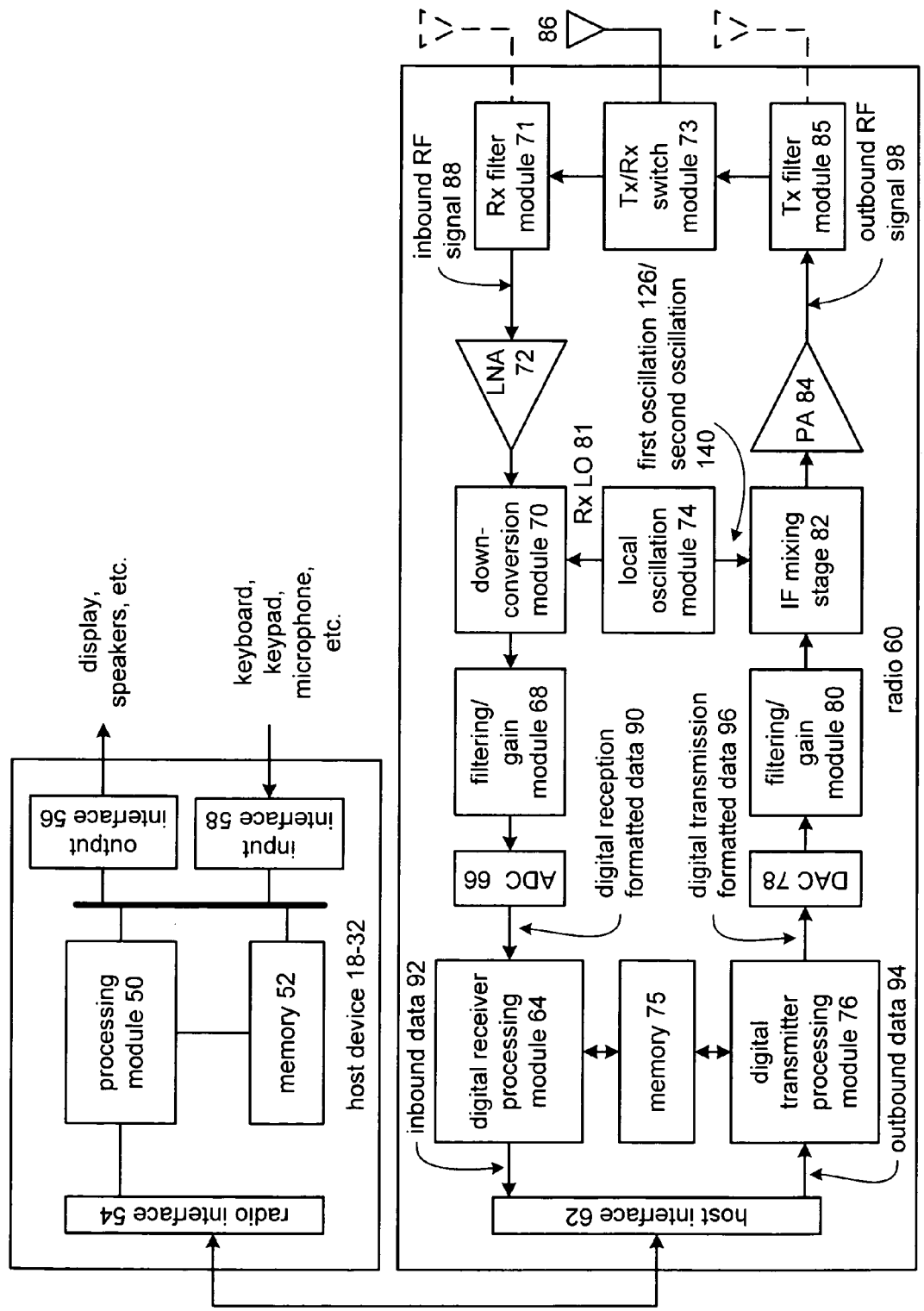
FIG. 3 is a schematic block diagram of a wireless communication device in accordance with the present invention.

FIG. 3 is a schematic block diagram illustrating a wireless communication device that includes the host device 18-32 and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host device 18-32 includes a processing module 50, memory 52, radio interface 54, input interface 58 and output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output display device such as a display, monitor, speakers, et cetera such that the received data may be displayed. The radio interface 54 also provides data from the processing module 50 to the radio 60. The processing module 50 may receive the outbound data from an input device such as a keyboard, keypad, microphone, et cetera via the input interface 58 or generate the data itself. For data received via the input interface 58, the processing module 50 may perform a corresponding host function on the data and/or route it to the radio 60 via the radio interface 54.

Radio 60 includes a host interface 62, digital receiver processing module 64, an analog-to-digital converter 66, a filtering/attenuation module 68, an IF mixing down conversion stage 70, a receiver filter 71, a low noise amplifier 72, a transmitter/receiver switch 73, a local oscillation module 74, memory 75, a digital transmitter processing module 76, a digital-to-analog converter 78, a filtering/gain module 80, an IF mixing up conversion stage 82, a power amplifier 84, a transmitter filter module 85, and an antenna 86. The antenna 86 may be a single antenna that is shared by the transmit and receive paths as regulated by the transmit/receive switch 73, or may include separate antennas for the transmit path and the receive path. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, digital intermediate frequency to baseband conversion, demodulation, constellation demapping, decoding, and/or descrambling. The digital transmitter functions include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 64 and/or 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry.

In operation, the radio 60 receives outbound data 94 from the host device via the host interface 62. The host interface 62 routes the outbound data 94 to the digital transmitter processing module 76, which processes the outbound data 94 in accordance with a particular wireless communication standard (e.g., IEEE 802.11a, IEEE 802.11b, Bluetooth, et cetera) to produce digital transmission formatted data 96. The digital transmission formatted data 96 will be a digital base-band signal or a digital low IF signal, where the low IF typically will be in the frequency range of one hundred kilohertz to a few megahertz.

The digital-to-analog converter 78 converts the digital transmission formatted data 96 from the digital domain to the analog domain. The filtering/gain module 80 filters and/or adjusts the gain of the analog signal prior to providing it to the IF mixing stage 82. The IF mixing stage 82 directly converts the analog baseband or low IF signal into an RF signal based on an output oscillation (first oscillation 126 and/or second oscillation 140) provided by local oscillation module 74. IF mixing stage 82 can comprise a combined local oscillator/image-rejection mixer of the FSK modulator of the present invention. Local oscillation module 74 can comprise a receiver local oscillator and a transmitter VCO output oscillation source implemented in accordance with the teachings of the present invention. Local oscillation module 74 and IF mixing stage 82 can be discrete components or can be implemented as a combined oscillation-modulation stage for the transmit path. A separate local oscillation module 74 can be provided for the receiver section or the same local oscillation module 74 can provide a local oscillation signal for the receiver section and the transmit section. The power amplifier 84 amplifies the RF signal to produce outbound RF signal 98, which is filtered by the transmitter filter module 85. The antenna 86 transmits the outbound RF signal 98 to a targeted device such as a base station, an access point and/or another wireless communication device.

The radio 60 also receives an inbound RF signal 88 via the antenna 86, which was transmitted by a base station, an access point, or another wireless communication device. The antenna 86 provides the inbound RF signal 88 to the receiver filter module 71 via the Tx/Rx switch 73, where the Rx filter 71 bandpass filters the inbound RF signal 88. The Rx filter 71 provides the filtered RF signal to low noise amplifier 72, which amplifies the signal 88 to produce an amplified inbound RF signal. The low noise amplifier 72 provides the amplified inbound RF signal to the IF mixing module 70, which directly converts the amplified inbound RF signal into an inbound low IF signal or baseband signal based on a receiver local oscillation 81 provided by local oscillation module 74, which may be implemented in accordance with the teachings of the present invention. The down conversion module 70 provides the inbound low IF signal or baseband signal to the filtering/gain module 68. The filtering/gain module 68 filters and/or gains the inbound low IF signal or the inbound baseband signal to produce a filtered inbound signal.

The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host device 18-32 via the radio interface 54.

As one of average skill in the art will appreciate, the wireless communication device of FIG. 3 may be implemented using one or more integrated circuits. For example, the host device may be implemented on one integrated circuit, the digital receiver processing module 64, the digital transmitter processing module 76 and memory 75 may be implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of the host device and the digital receiver and transmitter processing modules 64 and 76 may be a common processing device implemented on a single integrated circuit. Further, the memory 52 and memory 75 may be implemented on a single integrated circuit and/or on the same integrated circuit as the common processing modules of processing module 50 and the digital receiver and transmitter processing module 64 and 76.

Figure 4:
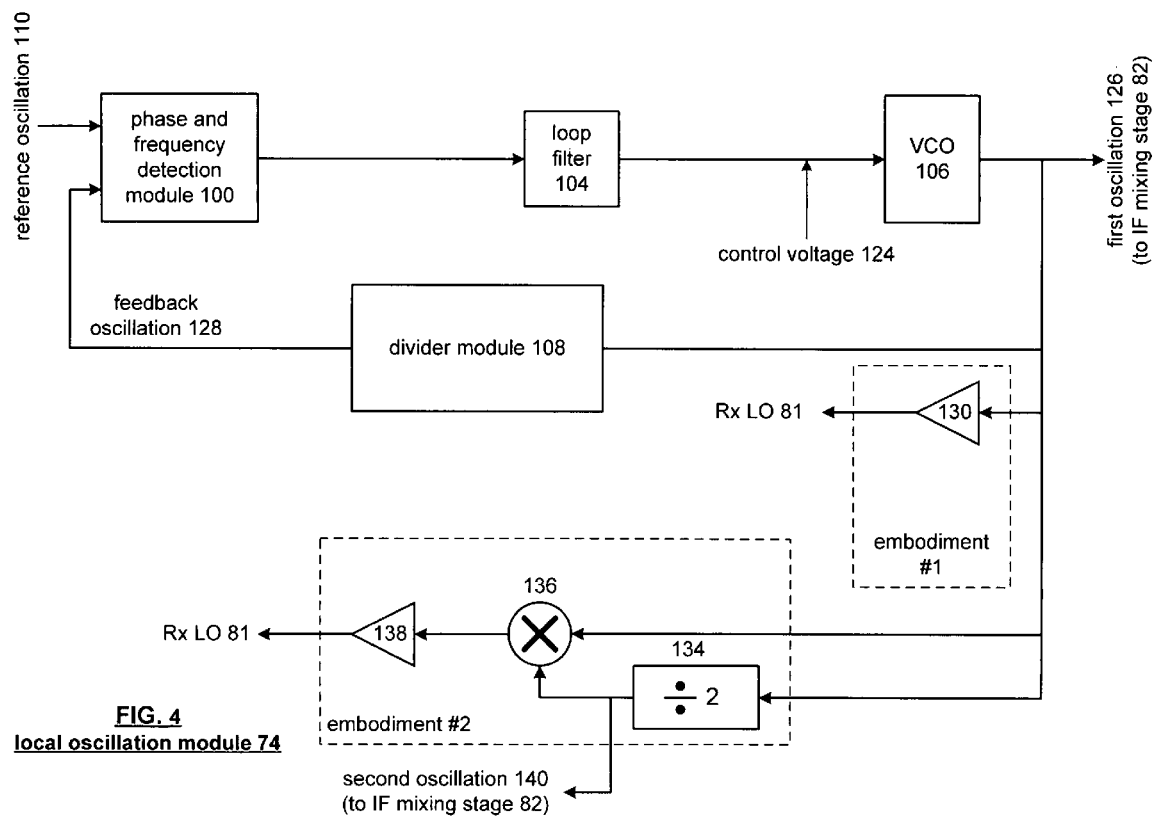
FIG. 4 is a schematic block diagram of a local oscillation module in accordance with the present invention.

FIG. 4 illustrates an embodiment of the local oscillation module 74 that includes a phase and frequency detection module 100, a charge pump 102, a loop filter 104, a voltage controlled oscillator (VCO) 106, and a divider module 108. The receiver local oscillation 81 may be generated from the first oscillation 126 in a variety of embodiments. In one embodiment, the receiver local oscillation 81 is directly produced from the first oscillation 126 via buffer 130. As one of average skill in the art will appreciate, an I and Q component for the receiver local oscillation 81 may be obtained by phase-shifting the I component of the receiver local oscillation 81 by 90°. In this embodiment, the transmitter local oscillation is generated from first oscillation 126 by IF mixing stage 82 in accordance with an embodiment of the present invention that will be discussed with regard to FIG. 5.

In an alternate embodiment, the receiver local oscillation 81 may be produced by a plurality of logic gates. As shown, the first oscillation 126 may be divided via a frequency divider module 134, which can be a divide-by-2 module, to produce a second oscillation 140 and then multiplied via mixer (multiplier) 136. The resulting oscillation from mixer 136 has a frequency that is 1-½ times the frequency of first oscillation 126. From this increased oscillation the receiver local oscillation 81 is derived via buffer 138. As one of average skill in the art will appreciate, the first oscillation 126 may be phase-shifted by 90° and the logic circuitry repeated to produce a Q component for the receiver local oscillation 81. In this embodiment, second oscillation 140 and first oscillation 126 are both provided to IF mixing stage 82 to generate the transmitter local oscillation in accordance with the embodiment of the FSK modulator of this invention illustrated in FIG. 6.

The phase and frequency detection module 100 is operably coupled to receive a reference oscillation 110 and a feedback oscillation 128 and detect a phase and/or frequency difference between them. The reference oscillation 110 may be produced by a crystal oscillator and/or another type of clock source. Phase and frequency detection module 100, loop filter 104, VCO 106 and divider module 108 can be any such frequency detection module, loop filter, VCO and divider module as known to those in the art. Alternatively, they can be the like-named components as described in co-pending patent application BP 2295, entitled LINEARIZED FRACTIONAL-N SYNTHESIZER HAVING A GATED OFFSET, having a filing date of Jun. 12, 2002, and a serial number of Ser. No. 10,170.849, which is hereby fully incorporated by reference. The loop filter 104 provides the control voltage 124 to the voltage control oscillator 106. The voltage control oscillator 106 generates the first oscillation 126 based on the control voltage 124. The divider module 108 divides the first oscillation 126 by either a fractional-N divider value or by a positive whole value to produce the feedback oscillation 128.

Figure 5:
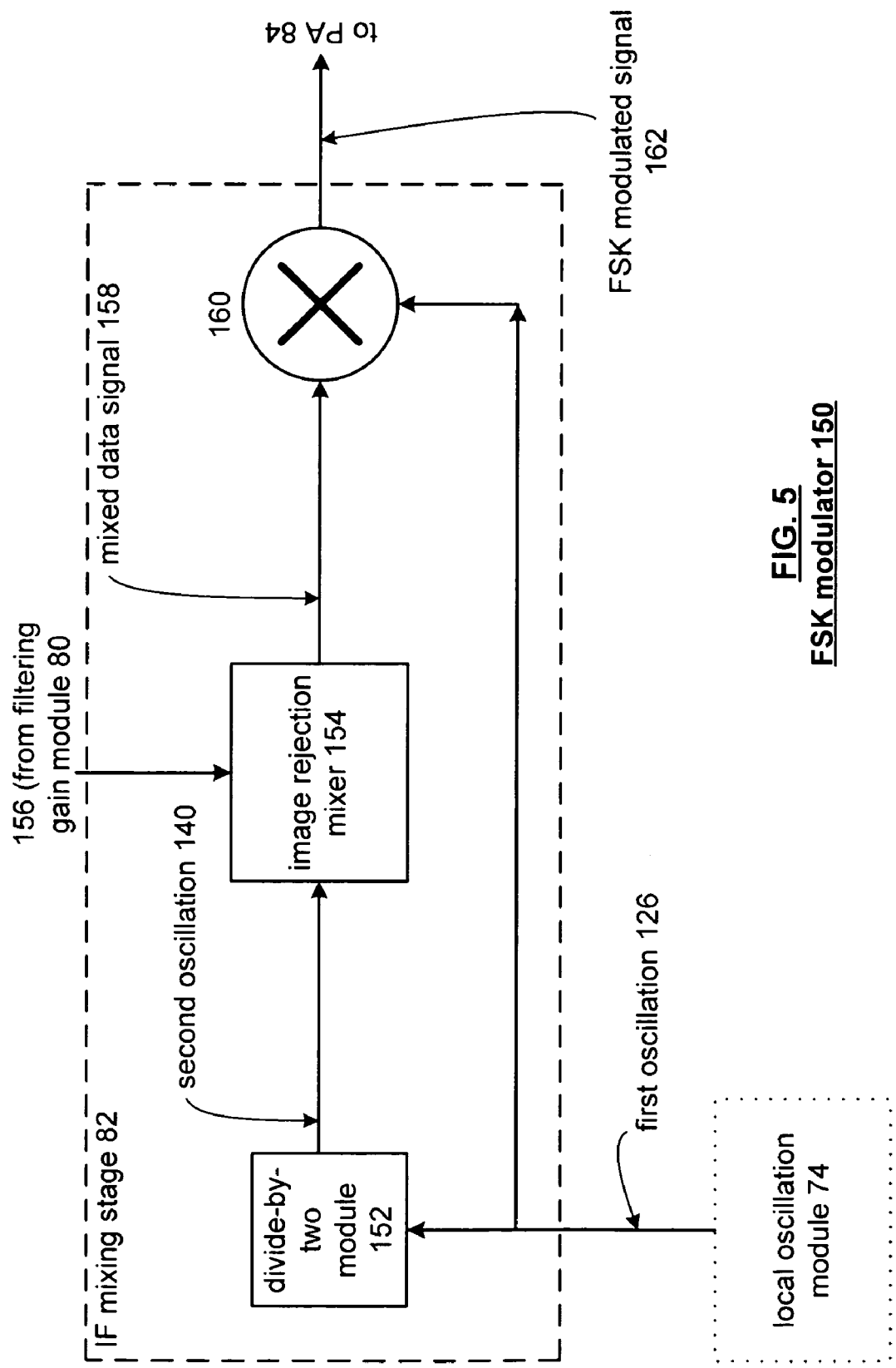
FIG. 5 is a simplified schematic block diagram of an embodiment of an FSK modulator in accordance with the present invention.

FIG. 5 is a schematic block diagram of an embodiment of FSK modulator 150 that includes a phase lock loop, a divide-by-two module, an image rejection mixer 154, and a mixing module 160. FSK modulator 150 can be incorporated within or can be IF mixing stage 82 of FIG. 3. FSK modulator 150 includes the phase-locked loop portion of local oscillation module 74 according to the first embodiment discussed with reference to FIG. 4. Local oscillation module 74 is operably coupled to generate and then provide first oscillation 126 to divider module 152 and to summing module 160. Divider module 152, which can be the same as divider module 134, comprises a divide-by-2 module. Divider module 152 is operably coupled to divide first oscillation 126 to produce second oscillation 140. Image rejection mixer 154 is operably coupled to mix second oscillation signal 140 with a low intermediate oscillation 156 to produce a mixed data signal 158. Summing module 160 is operably coupled to sum the mixed data signal 158 with the first oscillation 126 to produce an FSK modulated signal 162.

The embodiments of the FSK modulator 150 of the present invention modify the architecture of prior art local oscillation and modulation schemes by combining a local oscillation generator and an FSK modulator such that FSK modulation is performed at a lower frequency. By applying the FSK modulation at a lower frequency (e.g., 800 MHz), it is easier to achieve a tighter I-Q balance. The lower frequency FSK modulation also reduces or eliminates the possibility for on-frequency feedback of the FSK modulated signal 162, making the FSK modulator 150 more robust and layout indifferent. Further, because the major components of the system (i.e., local oscillation generator and FSK modulator) are typically already on-chip, an increase in circuit size is not required as no additional components are added.

Returning to FIG. 5, first oscillation 126 can be, for example, a 1600 MHz VCO output oscillation. In this case, second oscillation 140 will be an 800 MHz oscillation. Low intermediate oscillation 156 can typically be a +/−160 KHz baseband data signal comprising the FSK modulated baseband data being transmitted. This combination results in an 800 MHz +/−160 KHz mixed data signal 158 and in a 2400 MHz +/−160 KHz FSK modulated signal 160. Mixed data signal 158 thus comprises a mixed local oscillation and baseband signal.

Figure 6:
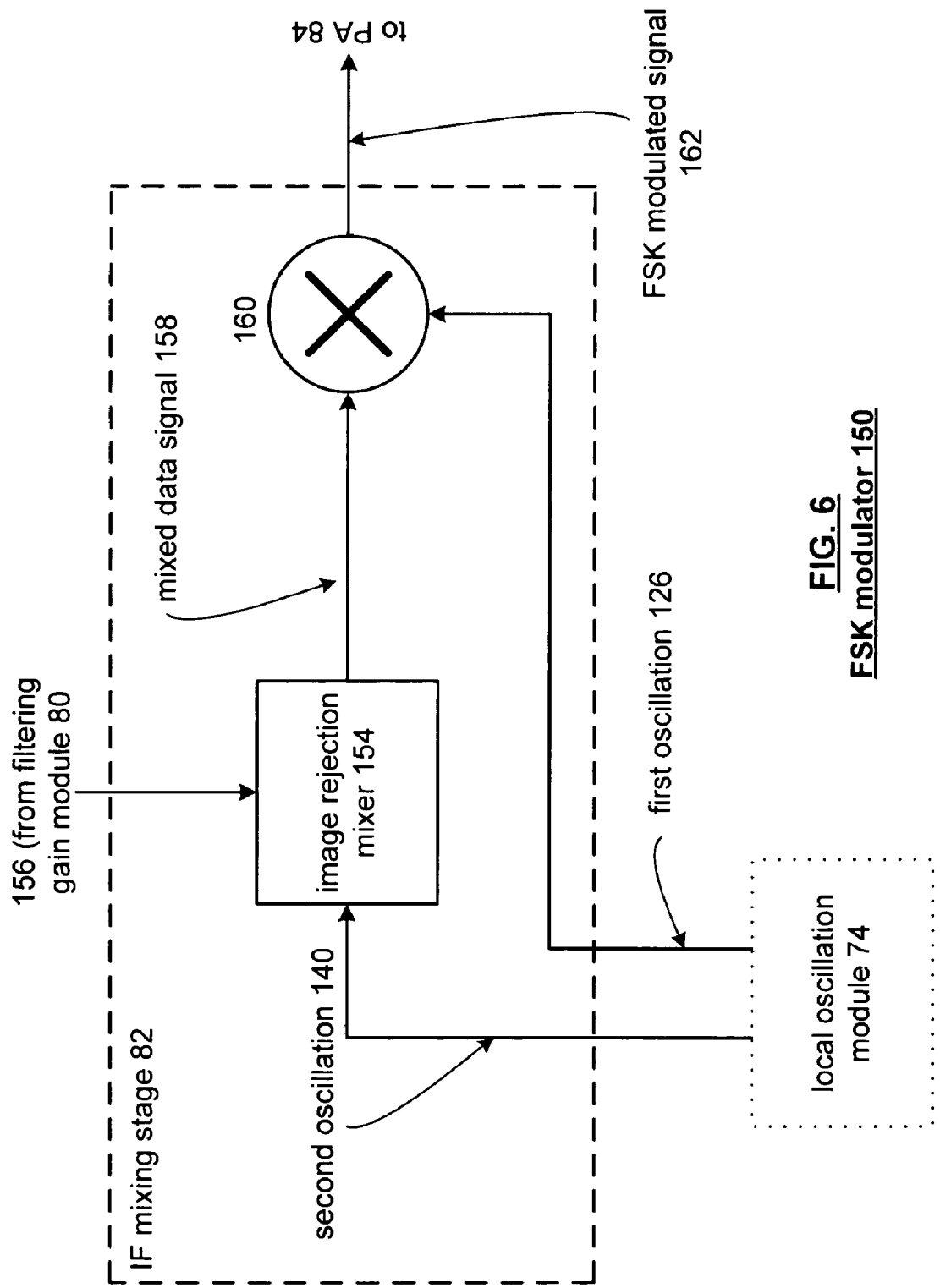
FIG. 6 is a simplified schematic block diagram of an alternate embodiment of an FSK modulator in accordance with the present invention.

FIG. 6 is a schematic block diagram of an alternate embodiment of FSK modulator 150. In this embodiment, FSK modulator 150 includes the phase-locked loop portion of local oscillation module 74 according to the second embodiment discussed with reference to FIG. 4. Local oscillation module 74 is operably coupled to generate and then provide first oscillation 126 to summing module 160 and to generate and provide second oscillation 140 to image rejection mixer 154. The operation of the FSK modulator 150 of FIG. 6 is otherwise identical to that of the FSK modulator 150 illustrated in FIG. 5.

Figure 7:
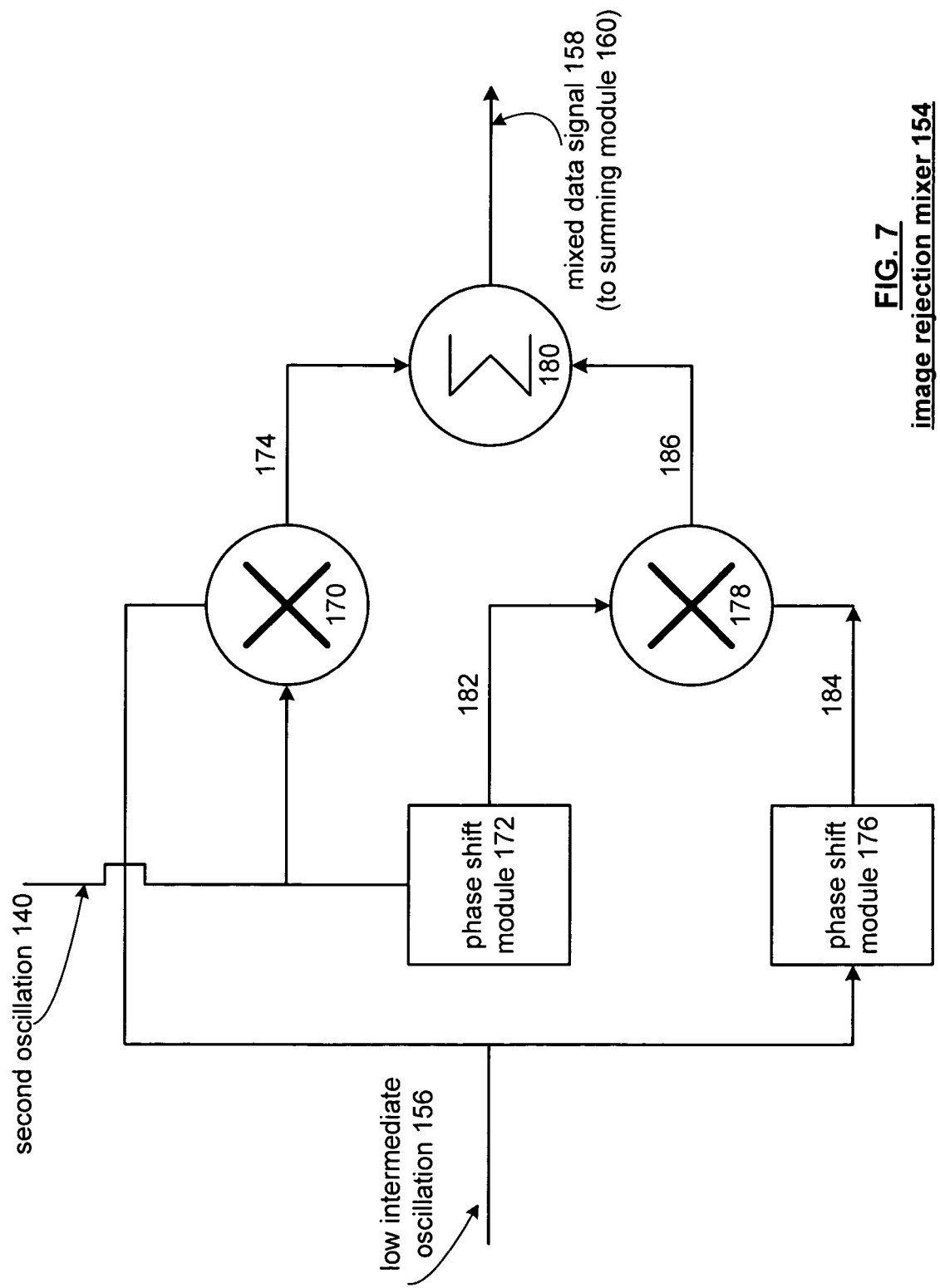
FIG. 7 is a schematic block diagram of an image-rejection mixer in accordance with the present invention.

FIG. 7 is a schematic block diagram of image rejection mixer 154 of FIGS. 5 and 6. Image rejection mixer 154 comprises a first mixer 170, a first phase-shift module 172, a second phase-shift module 176, a second mixer 178 and a mixer summing module 180. First mixer 170 is operably coupled to mix the second oscillation 140 with the low intermediate oscillation 156 to produce a first mixed oscillation 174. First phase-shift module 172 is operably coupled to phase-shift the second oscillation 140 to produce a phase-shifted second oscillation 182. Second phase-shift module 176 is operably coupled to phase-shift the low intermediate oscillation 156 to produce a phase-shifted low intermediate oscillation 184. Second mixer 178 is operably coupled to mix the phase-shifted second oscillation 182 with the phase-shifted low intermediate oscillation 184 to produce a second mixed oscillation 186. Mixer summing module 180 is operably coupled to sum the first mixed oscillation 174 with the second mixed oscillation 186 to produce the mixed data signal 158. Phase-shift modules 172 and 176 can be ninety degree phase-shift modules and, as one of average skill in the art will appreciate, are used to phase-shift the component oscillations of the mixed data signal 158 to produce a Q component for mixed data signal 158.

Figure 8:
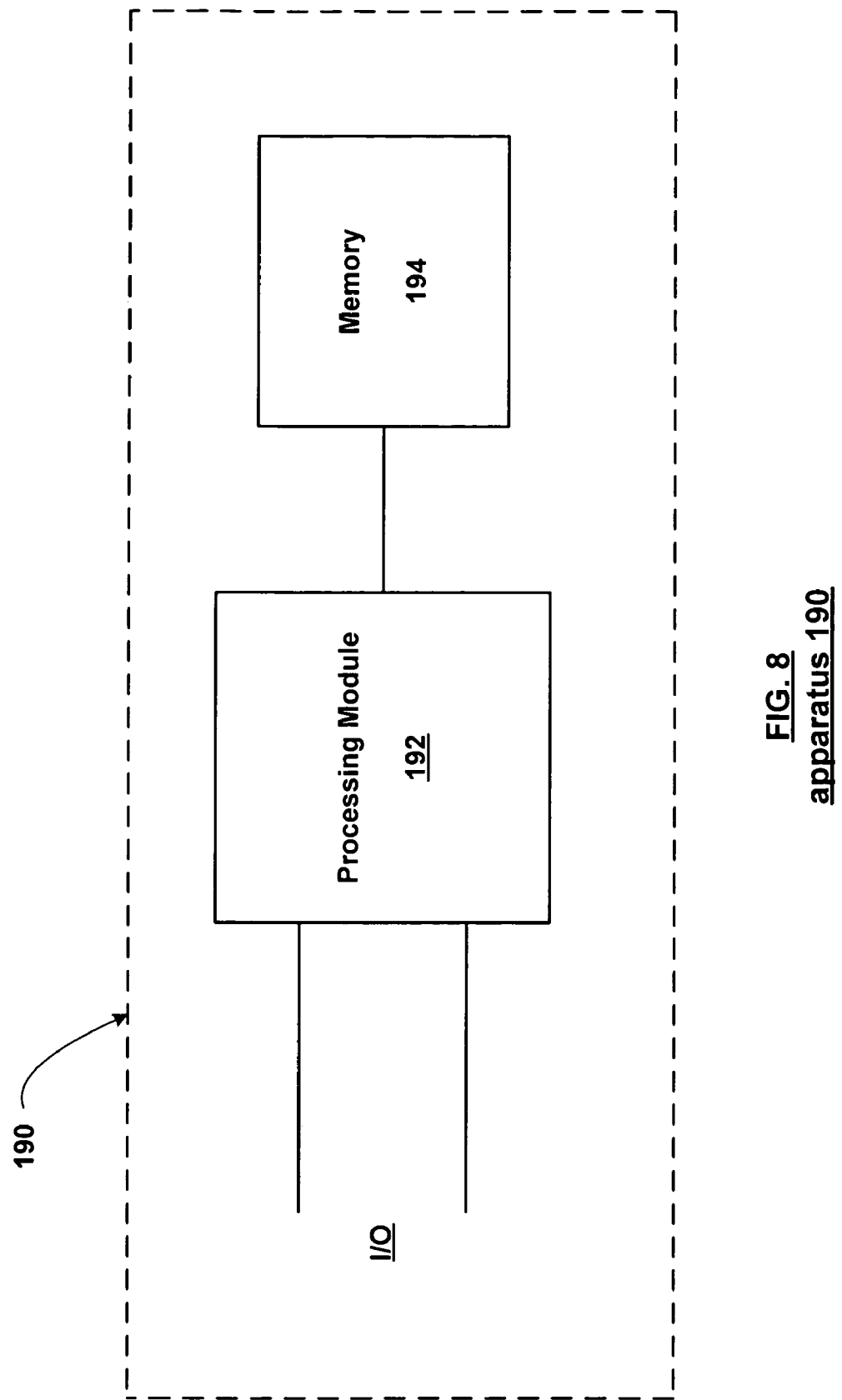
FIG. 8 is a simplified schematic block diagram of an apparatus for FSK modulation in accordance with the present invention.

A further embodiment of the present invention can comprise an apparatus for FSK modulation. As shown in FIG. 8, the apparatus 190 can comprise a processing module 192 and a memory 194. Processing module 192 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 194 may be a single memory device or a plurality of memory devices. Such a memory device may be a read-only memory, random access memory, volatile memory, non-volatile memory, static memory, dynamic memory, flash memory, and/or any device that stores digital information. Note that when the processing module 192 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. The memory 194 stores, and the processing module 192 executes, operational instructions corresponding to at least some of the steps and/or functions illustrated in FIGS. 3-7.

In a particular embodiment of apparatus 190, the memory 194 is operably coupled to processing module 192 and includes operational instructions that cause the processing module 192 to generate the first oscillation 126, divide the first oscillation 126 to produce a second oscillation 140, image-rejection mix the second oscillation 140 with a low intermediate oscillation 156 to produce a mixed data signal 158 and sum the mixed data signal 158 with the first oscillation 126 to produce an FSK modulated signal 162. Further embodiments include the associated methods and applications of the FSK modulator of the present invention.

The embodiments of the FSK modulator of this invention can be incorporated, and it is contemplated that they will be used, in UHF and higher communication systems. One application could be an RF application specific integrated circuit (ASIC). For example, the Broadcom BCM2033 single-chip Bluetooth solution, manufactured by Broadcom Corporation of Irvine, Calif., can incorporate such an ASIC.

The preceding discussion has presented an FSK modulator and method for FSK modulation. Instead of separately modulating a high frequency (e.g., 2400 MHz) local oscillation, the FSK modulator of this invention comprises a combination of a local oscillation generator and a modulator. In particular, the FSK modulator performs the signal modulation at a point where the VCO output oscillation has been divided down (e.g., by two) and the frequency is lowest. The FSK modulator of this invention can therefore maintain good I-Q balance across frequency, temperature, and process better than prior art high frequency local oscillation and modulation schemes. As one of average skill in the art will appreciate, other embodiments may be derived from the teaching of the present invention, without deviating from the scope of the claims.

What is claimed is:

1. A frequency shift keying (FSK) modulator comprises:
   a phase-locked loop operably coupled to generate a first oscillation from a reference oscillation;
   a frequency divider module operably coupled to divide the first oscillation to produce a second oscillation;
   an image-rejection mixer operably coupled to mix the second oscillation with a low intermediate oscillation to produce a mixed data signal, wherein the image-rejection mixer includes:
      a first mixer operably coupled to mix the second oscillation with the low intermediate oscillation to produce a first mixed oscillation;
      a first phase-shift module operably coupled to phase-shift the second oscillation to produce a phase-shifted second oscillation;
      a second phase-shift module operably coupled to phase-shift the low intermediate frequency (IF) oscillation to produce a phase-shifted low IF oscillation;
      a second mixer operably coupled to mix the phase-shifted second oscillation with the phase-shifted low intermediate oscillation to produce a second mixed oscillation; and
      a mixer summing module operably coupled to sum the first mixed oscillation with the second mixed oscillation to produce the mixed data signal; and
   a summing module operably coupled to sum the mixed data signal with the first oscillation to produce an FSK modulated signal.

2. The FSK modulator of claim 1, wherein the frequency of the first oscillation is twice the frequency of the second oscillation.

3. The FSK modulator of claim 1, wherein the frequency divider module is a divide by n module, where n is a positive whole number.

4. The FSK modulator of claim 3, wherein n=2.

5. The FSK modulator of claim 1 wherein the first and second phase-shift modules are ninety-degree phase-shift modules.

6. A method for frequency shift keying (FSK) modulation, the method comprises:
   generating a first oscillation;
   dividing the first oscillation by a divider value to produce a second oscillation;

image-rejection mixing the second oscillation with a low intermediate frequency (IF) FSK modulated data signal to produce a mixed data signal, wherein the image-rejection mixing includes:
mixing the second oscillation with the low intermediate oscillation to produce a first mixed oscillation;
phase-shifting the second oscillation to produce a phase-shifted second oscillation;
phase-shifting the low intermediate oscillation to produce a phase-shifted low intermediate oscillation;
mixing the phase-shifted second oscillation with the phase-shifted low intermediate oscillation to produce a second mixed oscillation; and
summing the first mixed oscillation with the second mixed oscillation to produce the mixed data signal; and
summing the mixed data signal with the first oscillation to produce an FSK modulated signal.

7. The method of claim 6, wherein the first oscillation is a 1600 MHz oscillation and wherein the second oscillation is an 800 MHz oscillation.

8. The method of claim 6, wherein dividing comprises dividing by n, where n is a positive whole number.

9. The method of claim 8, wherein n=2.

10. The method of claim 6, wherein phase-shifting the second oscillation comprises phase-shifting the second oscillation by ninety degrees and wherein phase-shifting the low intermediate oscillation comprises phase-shifting the low intermediate oscillation by ninety degrees.

11. An apparatus for frequency shift keying (FSK) modulation, the apparatus comprises:
a processing module; and
a memory operably coupled to the processing module, wherein the memory includes operational instructions that cause the processing module to:
generate a first oscillation;
divide the first oscillation to produce a second oscillation;
image-rejection mix the second oscillation with a low intermediate oscillation to produce a mixed data signal, wherein the image-rejection mixing includes:
mixing the second oscillation with the low intermediate oscillation to produce a first mixed oscillation;
phase-shifting the second oscillation to produce a phase-shifted second oscillation;
phase-shifting the low intermediate oscillation to produce a phase-shifted low intermediate oscillation;
mixing the phase-shifted second oscillation with the phase-shifted low intermediate oscillation to produce a second mixed oscillation; and
summing the first mixed oscillation with the second mixed oscillation to produce the mixed data signal; and
sum the mixed data signal with the first oscillation to produce an FSK modulated signal.

12. The apparatus of claim 11, wherein the frequency of the first oscillation is twice the frequency of the second oscillation.

13. The apparatus of claim 11, wherein dividing comprises dividing by n, where n is a positive whole number.

14. The apparatus of claim 13, wherein n=2.

15. The apparatus of claim 11, wherein phase-shifting the second oscillation comprises phase-shifting the second oscillation by ninety degrees and wherein phase-shifting the low intermediate oscillation comprises phase-shifting the low intermediate oscillation by ninety degrees.

16. A radio comprising:
a transmitter section operably coupled to convert outbound data into outbound radio frequency (RF) signals based on a transmitter local oscillation;
a receiver section operably coupled to convert inbound RF signals into inbound data based on a receiver local oscillation;
a local oscillator operably coupled to produce the receiver local oscillation, wherein the local oscillator further comprises:
a phase-locked loop operably coupled to generate a first oscillation from a reference oscillation;
a frequency divider module operably coupled to divide the first oscillation to produce a second oscillation; and
a mixer operably coupled to sum the second oscillation with the first oscillation to produce the receiver local oscillation; and
a frequency shift keying (FSK) modulator operably coupled to produce the transmitter local oscillation and an FSK modulated signal, wherein the FSK modulator comprises:
the phase-locked loop;
the frequency divider module;
an image-rejection mixer operably coupled to mix the second oscillation with a low intermediate oscillation to produce a mixed data signal; and
a summing module operably coupled to sum the mixed data signal with the first oscillation to produce the FSK modulated signal.

17. The radio of claim 16, wherein the frequency of the first oscillation is twice the frequency of the second oscillation.

18. The radio of claim 16, wherein the frequency divider module is a divide by n module, where n is a positive whole number.

19. The radio of claim 18, wherein n=2.

20. The radio of claim 16, wherein the image-rejection mixer further comprises:
a first mixer operably coupled to mix the second oscillation with the low intermediate oscillation to produce a first mixed oscillation; a first phase-shift module operably coupled to phase-shift the second oscillation to
produce a phase-shifted second oscillation;
a second phase-shift module operably coupled to phase-shift the low intermediate oscillation to produce a phase-shifted low intermediate oscillation;
a second mixer operably coupled to mix the phase-shifted second oscillation with the phase-shifted low intermediate oscillation to produce a second mixed oscillation; and
a mixer summing module operably coupled to sum the first mixed oscillation with the second mixed oscillation to produce the mixed data signal.

21. The radio of claim 20, wherein the first and second phase-shift modules are ninety-degree phase-shift modules.

22. A radio comprising:
a transmitter section operably coupled to convert outbound data into outbound radio frequency (RF) signals based on a transmitter local oscillation;
a receiver section operably coupled to convert inbound RF signals into inbound data based on a receiver local oscillation;
a processing module; and a memory operably coupled to the processing module, wherein the memory includes operational instructions that cause the processing module to:
   produce the receiver local oscillation; and
   produce the transmitter local oscillation and an FSK modulated signal, wherein producing the transmitter local oscillation and the FSK modulated signal comprises:
      generating a first oscillation;
      dividing the first oscillation to produce a second oscillation;
      image-rejection mixing the second oscillation with a low intermediate oscillation to produce a mixed data signal; and
      summing the mixed data signal with the first oscillation to produce the FSK modulated signal.

23. The radio of claim 22, wherein the frequency of the first oscillation is twice the frequency of the second oscillation.

24. The radio of claim 22, wherein dividing comprises dividing by n, where n is a positive whole number.

25. The radio of claim 24, wherein n=2.

26. The radio of claim 22, wherein image-rejection mixing further comprises:
   mixing the second oscillation with the low intermediate oscillation to produce a first mixed oscillation;
   phase-shifting the second oscillation to produce a phase-shifted second oscillation;
   phase-shifting the low intermediate oscillation to produce a phase-shifted low intermediate oscillation;
   mixing the phase-shifted second oscillation with the phase-shifted low intermediate oscillation to produce a second mixed oscillation; and
   summing the first mixed oscillation with the second mixed oscillation to produce the mixed data signal.

27. The radio of claim 22, wherein phase-shifting the second oscillation comprises phase-shifting the second oscillation by ninety degrees and wherein phase-shifting the low intermediate oscillation comprises phase-shifting the low intermediate oscillation by ninety degrees.

* * * * *

UNITED STATES PATENT AND TRADEMARK OFFICE
CERTIFICATE OF CORRECTION

PATENT NO. : 7,474,709 B2
APPLICATION NO. : 10/837064
DATED : January 6, 2009
INVENTOR(S) : Tom Baker and Henrik T. Jensen It is certified that error appears in the above-identified patent and that said Letters Patent is hereby corrected as shown below:

Column 10, line 60, in Claim 5: after "claim 1" insert --,--.

Signed and Sealed this

Second Day of June, 2009

JOHN DOLL
*Acting Director of the United States Patent and Trademark Office*